UNITED STATES PATENT OFFICE.

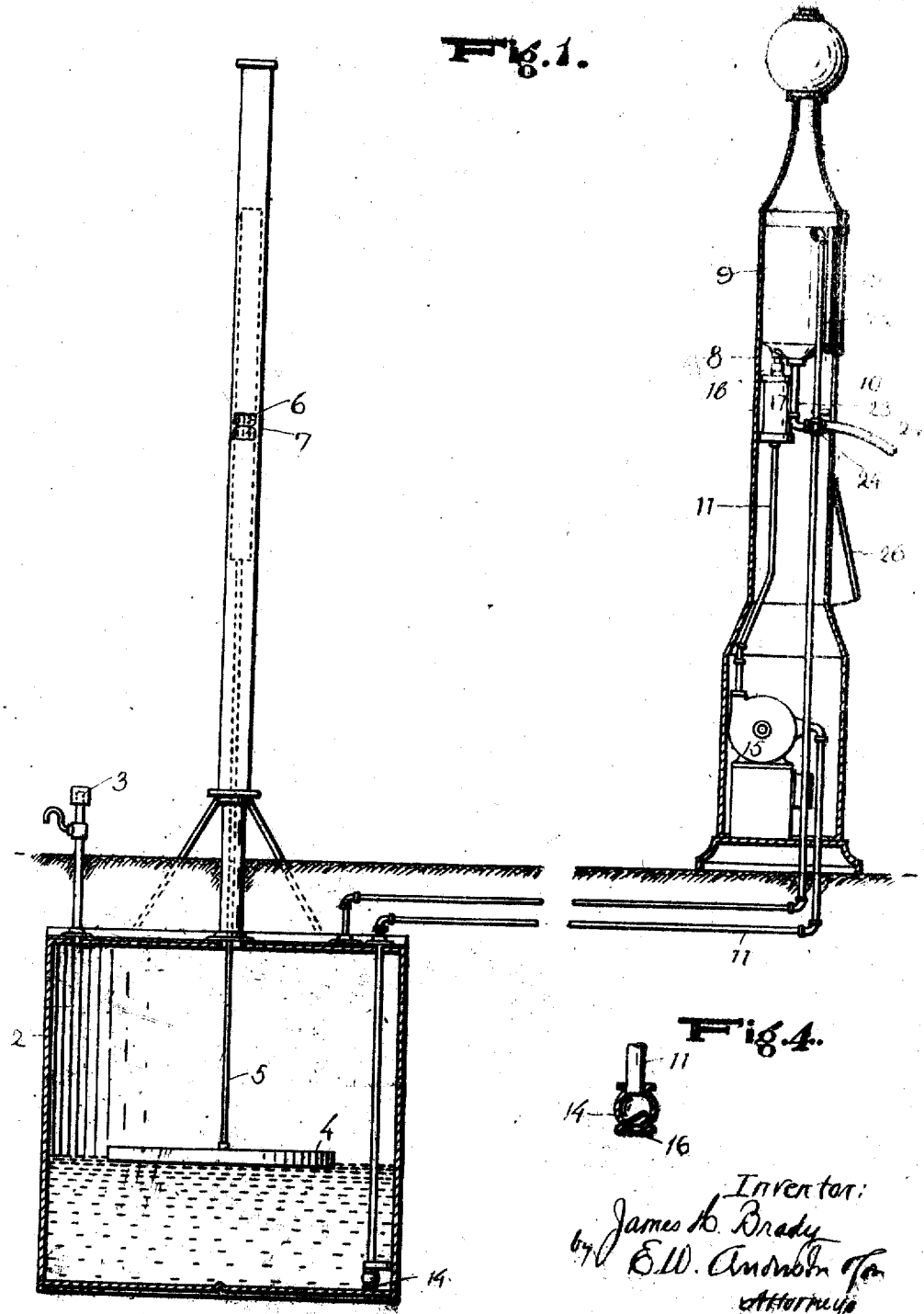

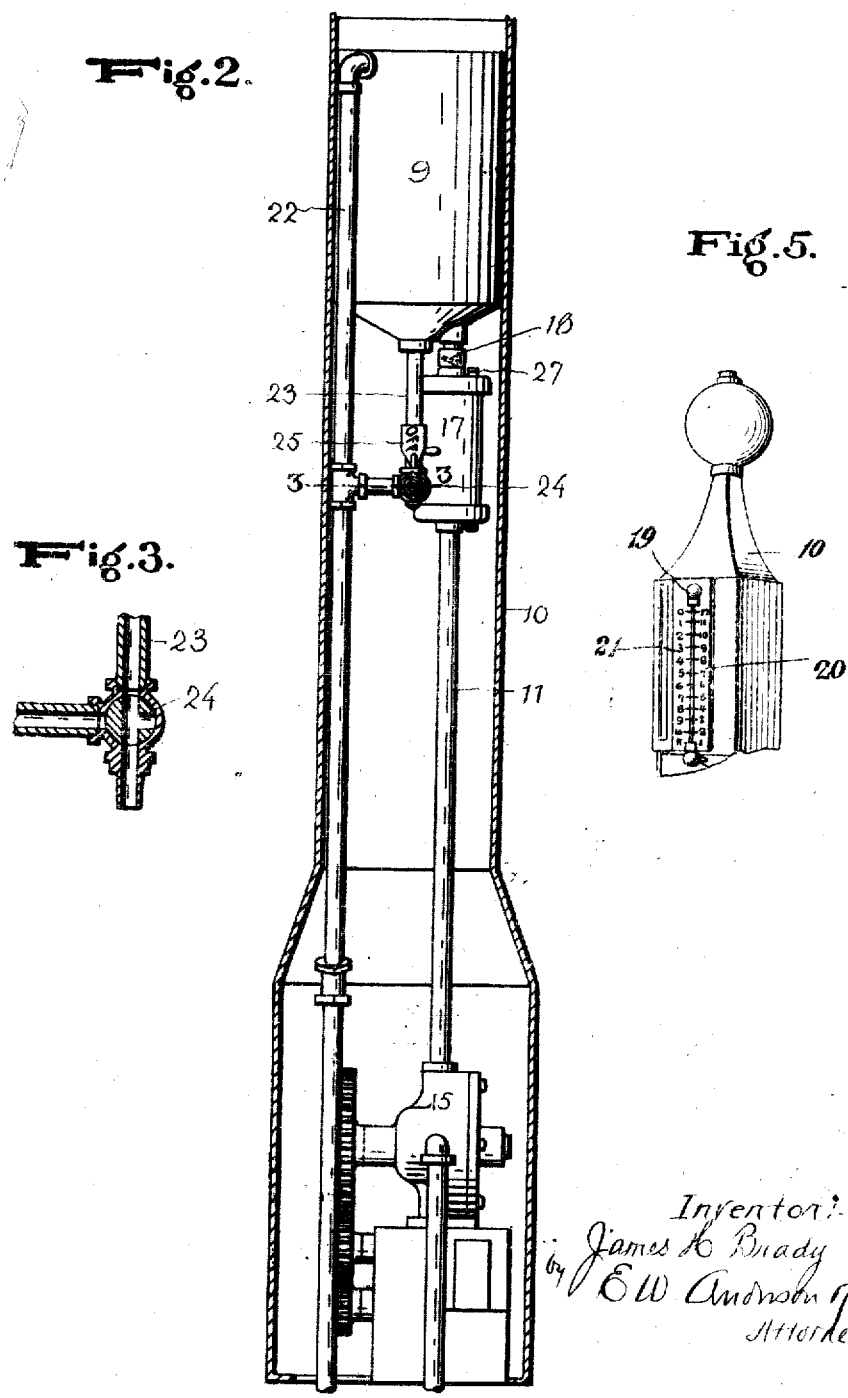

JAMES HENRY BRADY, OF LOUISVILLE, KENTUCKY, ASSIGNOR TO VISIBLE MEASURE GASOLINE DISPENSER COMPANY OF AMERICA, OF LOUISVILLE, KENTUCKY, A CORPORATION OF NORTH DAKOTA.

GASOLENE-DISPENSING APPARATUS.

1,331,615.

Specification of Letters Patent. Patented Feb. 24, 1920.

Application filed October 24, 1918. Serial No. 259,600.

*To all whom it may concern:*

Be it known that I, JAMES H. BRADY, a citizen of the United States, resident of Louisville, in the county of Jefferson and State of Kentucky, have made a certain new and useful Invention in Gasolene-Dispensing Apparatus; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a central vertical section of the invention, with parts in full lines, and showing an electric pump.

Fig. 2 is a side view of the dispenser, the casing thereof being sectioned, and parts being broken away.

Fig. 3 is a detail section on the line 3—3, Fig. 2.

Fig. 4 is a detail sectional view of one of the check valves.

Fig. 5 is a detail perspective view of the upper part of the dispenser casing showing the graduated gage for the receiving vessel.

The invention has relation to instruments for dispensing liquids, as gasolene, having for an object to provide reliable means for ascertaining definitely the amount of oil delivered by the wholesaler to the dealer or garage owner, and the amount delivered by the dealer to customers. Another object is to avoid waste of gasolene through careless handling of the same, and to avoid errors or peculations or fraudulent deliveries, thereby conserving the gasolene supply. Another object is to provide indisputable means for assuring both the customer and the dealer that each has received a full and proper delivery of the amount of gasolene contracted and paid for.

In the gasolene dispensers now used, it is recognized that there is no proper means for avoiding errors or peculations, which are taking place with alarming frequency and totaling very considerable losses, this being due to the fact that either the dispensers do not register, or if they do register the registration is inaccurate, and that there is no means for checking up on the registration, to ascertain if it is correct.

The invention consists in the novel construction and combinations of parts, coming within the scope of the claims as hereafter set forth.

In the accompanying drawings, illustrating an embodiment of the invention, the numeral 2 designates a supply tank, ground tank or reservoir, having a filling opening 3. To indicate the amounts of liquid in the supply tank, there is provided a float 4, resting upon the surface of the liquid and provided centrally thereof with an upright, movable indicating member or rod 5 bearing a gage or scale 6, extending above the level of tank 2 and movable vertically through the change of level of the liquid contents of the tank, a stationary marker 7 showing upon the movable scale the contents of the tank in gallons.

A gasolene dispenser 8 is located suitably to serve customers, and may be either adjacent to the supply tank or spaced apart therefrom by a considerable distance, according to the special conditions or requirements.

This dispenser is provided with a receiving tank or measuring vessel 9, located at a higher level than the supply tank and usually in the upper portion of an upright casing 10. Between the two tanks 2 and 9 is a conduit for delivery of the liquid from the supply to the receiving tank. As illustrated this conduit includes a pipe 11, opening into the bottom portion of the receiving tank and communicating with the supply tank near the bottom of the latter, a check valve 14 being disposed at the lower end of the pipe 11, beneath the level of the liquid in the supply tank.

To furnish gasolene to the receiving tank a suitable pump 15 is interposed in the pipe line 11, being as shown an electrically operated centrifugal pump, the closing and opening of an electric circuit by the pressure and release of a push button switch serving to set the pump into and out of action to start and stop the supply of liquid. The liquid is filtered by a filter cloth or mesh 16 below the check valve 14, and by a filter 17 interposed in the said pipe line above the pump. A suitable check valve 18, located above the filter and close to the bottom of the measuring vessel, assists in holding the gasolene up in the pipe line, close to the said vessel, once the pump is primed and a delivery effected.

The receiving tank 9, which also serves as a dispenser tank, is provided with means to indicate the amount of liquid therein. In the present embodiment this means comprises a vertical gage glass 19, communicating at its upper and lower ends with the interior of the tank and showing at all times the amount of liquid delivered to the tank from the supply tank by the operation of the pump. A scale adjacent to the gage glass is graduated to show in gallons and fractions thereof the contents of the receiving tank, said scale being preferably double and including a scale 20, at one side of the glass, reading upwardly, and a scale 21, at the other side of the glass, reading downwardly.

It is preferred that the receiving tank shall have delivered thereto for each sale or transaction a definite, predetermined quantity of gasolene, as, for instance, 10 gallons, and to enable this to be done, an overflow conduit or pipe 22 communicates with the supply tank and returns to the latter any liquid delivered to the receiving tank above a certain height, being the ten gallon line, said overflow pipe communicating with a drain pipe 23 leading from a dispensing port in the bottom of the measuring vessel.

A three-way valve 24 to control dispensing is interposed in the drain pipe 23 at a suitable height for convenient operation by the dealer, and a delivery hose 24' has connection with this valve, whereby, upon operation of the valve, the contents of the receiving tank 9 or any portion thereof can be run into the container of the automobile, and upon further operation of the valve any remainder of gasolene in the tank 9 may be gravitated back to the supply tank 2. It will be perceived that the receiving tank may be drained into the supply tank at will, by operation of valve 24.

To plainly show in which direction the gasolene is passing from the measuring vessel, an indicator 25 is fast upon the handle of the three-way valve, and has marked thereon the sign "To you" or "To auto" for one position of the handle, and "Back to tank" and "Off" for the other positions of the handle.

The dispenser casing is provided with an inclined support or rest 26 for a tablet, to be used in taking the readings of the measuring vessel scale for each sale.

The pump may be primed by removing the cap 27 of an upper opening of the filter casing 17 and pouring gasolene therein. In starting the operation of the apparatus, the pump is set in action by pressure of the push button switch, gasolene being delivered through the pipe 11 into the measuring vessel, to the ten gallon line, the push button being then released to stop the pump. The delivery hose being then inserted into the auto container, the three-way valve is operated and the required amount of gasolene delivered to the auto, after which the three-way valve is further operated to either drain back any excess into the supply tank or merely to stop the delivery to the automobile.

The three-way valve 24 enables the operator to dispense liquid from the receiving tank through the pipe 23 and simultaneously cut off flow from pipe 23 to the overflow pipe, a part of which latter pipe operates to drain when the valve 24 is properly set. Thus, when dispensing is being effected, communication between the dispensing port in the bottom of the receiving tank and the overflow pipe is closed, and when the valve is closed against dispensing said communication may be either closed or open, depending on the position of the valve.

It will be perceived that by the construction described, positive assurance of the dispensing of predetermined amounts of liquid is effected with a high degree of accuracy. The check valve 14 retains a constant amount of liquid in the intermediate conduit 11 between dispensing operations from the receiving tank, so that the indicators on the two tanks are checks on each other. These indicators are responsive to change of liquid level in the respective tanks, and in normal dispensing operations discharge from the supply tank is not only indicated by the indicator for that tank, but is also accurately indicated by the indicator of the receiving tank. This is believed to be due in great measure to the fact that the quantity of liquid in the intermediate conduit is a constant factor relative to each indicator, and that this constant factor is maintained, once the instrument has been operated.

I claim:

1. In a dispensing instrument for liquids, in combination, a supply tank, a receiving tank, a conduit for delivery of liquid from the supply to the receiving tank, means for each tank adapted to indicate the amounts of liquid therein respectively, means whereby a constant amount of liquid is retained in said conduit between dispensing operations from said receiving tank, and an overflow conduit for said receiving tank communicating with said supply tank.

2. In a dispensing instrument for liquids, in combination, a supply tank, a receiving tank, a conduit for delivery of liquid from the supply to the receiving tank, means for each tank adapted to indicate the amounts of liquid therein respectively, means whereby a constant amount of liquid is retained in said conduit between dispensing operations from said receiving tank, and means whereby the contents of the receiving tank may be drained into said supply tank at will.

3. In a dispensing instrument for liquids, in combination, a supply tank, a receiving tank, a conduit for delivery of liquid from the supply to the receiving tank, means for each tank adapted to indicate the amounts of liquid therein respectively, means whereby a constant amount of liquid is retained in said conduit between dispensing operations from said receiving tank, an overflow conduit for said receiving tank communicating with said supply tank, and means whereby the contents of the receiving tank may be drained into said supply tank at will.

4. In a dispensing instrument for liquids, in combination, a supply tank, a receiving tank, a conduit for delivery of liquid from the supply to the receiving tank, a pump in and for delivering the liquid through said conduit, means for each tank adapted to indicate the amounts of liquid therein respectively, means whereby a constant amount of liquid is retained in said conduit and pump between dispensing operations from said receiving tank, and an overflow conduit for said receiving tank communicating with said supply tank.

5. In a dispensing instrument for liquids, in combination, a supply tank, a receiving tank, a conduit for delivery of liquid from the supply tank to the receiving tank, means for each tank adapted to indicate the amount of liquid therein respectively, and means whereby a constant amount of liquid is retained in said conduit between dispensing operations from said receiving tank.

6. In a dispensing instrument for liquids, in combination, a supply tank, a receiving tank at a higher level than the supply tank, a delivery pipe between the two tanks, liquid content indicators for said tanks, a check valve for said delivery pipe beneath the level of liquid in said supply tank, and an overflow pipe leading from said receiving to said supply tank and permitting passage of the latter at all times.

7. In a dispensing instrument for liquids, in combination, a supply tank, a receiving tank at a higher level than the supply tank, a delivery pipe between the two tanks, liquid content indicators for said tanks, a check valve for said delivery pipe beneath the level of liquid in said supply tank, and an overflow pipe leading from said receiving to said supply tank and permitting passage to the latter at all times, the indicator for said supply tank including a movable indicating member above the level thereof and actuated by the liquid therein.

In testimony whereof I affix my signature in presence of two witnesses.

JAMES HENRY BRADY.

Witnesses:
　ISABEL TOMPKINS,
　M. E. GRIGSBY.